United States Patent
Wu et al.

(10) Patent No.: US 8,861,639 B2
(45) Date of Patent: Oct. 14, 2014

(54) METHOD FOR DETERMINING PRECODING MATRIX AND CORRESPONDING COMMUNICATION METHODS AND DEVICES

(75) Inventors: Lu Wu, PuDong Jinqiao Shanghai (CN); Jinhui Chen, PuDong Jinqiao Shanghai (CN); Yang Song, PuDong Jinqiao Shanghai (CN); Hongwei Yang, PuDong Jinqiao Shanghai (CN); Di Lv, PuDong Jinqiao Shanghai (CN); Hao Liu, PuDong Jinqiao Shanghai (CN)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 13/822,456

(22) PCT Filed: Aug. 24, 2011

(86) PCT No.: PCT/IB2011/002294
§ 371 (c)(1),
(2), (4) Date: Mar. 12, 2013

(87) PCT Pub. No.: WO2012/035425
PCT Pub. Date: Mar. 22, 2012

(65) Prior Publication Data
US 2013/0170578 A1    Jul. 4, 2013

(30) Foreign Application Priority Data

Sep. 16, 2010   (CN) .......................... 2010 1 0284095

(51) Int. Cl.
*H04L 27/00*    (2006.01)
*H04B 7/06*     (2006.01)
*H04L 25/03*    (2006.01)
*H04B 7/04*     (2006.01)

(52) U.S. Cl.
CPC .............. *H04B 7/0456* (2013.01); *H04B 7/065* (2013.01); *H04L 25/03343* (2013.01); *H04B 7/0626* (2013.01); *H04B 7/0426* (2013.01); *H04B 7/0617* (2013.01); *H04B 7/0469* (2013.01)
USPC ......................................................... 375/295

(58) Field of Classification Search
CPC .. H04B 7/0426; H04B 7/0617; H04B 7/0626; H04B 7/0456; H04L 25/03343
USPC ......................................................... 375/295
See application file for complete search history.

(56) References Cited

U.S. PATENT DOCUMENTS

| | | | |
|---|---|---|---|
| 2010/0034308 A1* | 2/2010 | Kim et al. ..................... | 375/267 |
| 2010/0054200 A1* | 3/2010 | Tsai ............................... | 370/329 |
| 2011/0122968 A1* | 5/2011 | Jongren et al. ................ | 375/296 |
| 2012/0003945 A1* | 1/2012 | Liu et al. ...................... | 455/115.1 |
| 2012/0039251 A1* | 2/2012 | Sayana et al. ................. | 370/328 |
| 2012/0219042 A1* | 8/2012 | Onggosanusi et al. ........ | 375/219 |
| 2013/0058386 A1* | 3/2013 | Mazzarese .................... | 375/219 |
| 2013/0129018 A1* | 5/2013 | Ko et al. ....................... | 375/296 |

FOREIGN PATENT DOCUMENTS

| | | |
|---|---|---|
| CN | 101212281 A | 7/2008 |
| CN | 101217304 A | 7/2008 |
| WO | WO2008/100214 A1 | 8/2008 |

OTHER PUBLICATIONS

Ericsson, et al., "Way Forward for Rel-10 Feedback Framework", R1-101683, Texas Instruments, ZTE, Mar. 1, 2010.
Alcatel-Lucent, "Way Forward on 8Tx Codebook for Rel. 10 DL MIMO", 3GPP TSG RAN WG1 62, R1-105011, Madrid Spain, Aug. 23-27, 2010.
Ericsson et al., "Way Forward for Rel-10 Feedback Framework," 3rd Generation Partnership Project (3GPP), 3GPP TSG RAD WG1 #60bis v0.1.0, R1-101683, 2 pages, Feb. 26, 2010.
International Search Report for PCT/IB2011/002294 dated Mar. 1, 2012.

* cited by examiner

*Primary Examiner* — Juan A Torres
(74) *Attorney, Agent, or Firm* — Fay Sharpe LLP

(57) ABSTRACT

A method for determining precoding matrix for the sub-band precoding in a transmitter with M transmitting antennas. The method includes determining an optimized first matrix $W_1$ according to wideband and/or long-term channel properties, multiplying the optimized first matrix $W_1$, with each second matrix $W_2$, in a second codebook, to obtain a plurality of candidate precoding matrices, the second matrix $W_2$ corresponds to frequency-selective and/or short-term channel properties; selecting an optimized one from the plurality of candidate precoding matrices for precoding the data to be transmitted, according to a frequency selection and/or a short-term channel state information. The amount of DFT beams may be increased to improve the spatial resolution; a diagonal matrix is involved in the first matrix $W_1$; and phase adjustment is involved in the second matrix $W_2$, so as to guarantee the adjusted phase is evenly distributed among the whole phase space.

9 Claims, No Drawings

METHOD FOR DETERMINING PRECODING MATRIX AND CORRESPONDING COMMUNICATION METHODS AND DEVICES

TECHNICAL FIELD

The invention relates to multi-antenna technology, particularly relates to precoding method in the multi-antenna technology.

BACKGROUND OF THE ART

According to the agreed way forward for Rel-10 feedback [R1-101683], a precoding matrix for a sub-band is composed of two matrices. One matrix denoted by $W_1$ targets wideband and/or long-term channel properties, and the other matrix denoted by $W_2$ targets frequency-selective and/or short-term channel properties. The multiplication product of these two matrices is taken as the precoding matrix for precoding the data.

In proposal R1-105011, a two-stage feedback approach is proposed, with $W_1$ being a M×Nb matrix and $W_2$ being a Nb×r matrix. In the $W_2$ codebook design of this approach, there is a co-phasing factor trying to match the phase between antennas 1~M/2 and antennas M/2~M. Therefore, this proposal needs to carry out data feedback for such as the co-phasing factor for the uniform linear array (ULA) antennas. This results in a certain amount of overhead, and the performance of the proposal is not satisfying.

SUMMARY OF THE INVENTION

The invention aims to propose a precoding scheme based on a new codebook. According to a first aspect of the invention, it is provided a method for determining precoding matrix for the sub-band precoding in a transmitter, wherein the transmitter has M transmitting antennas, and the method comprises: a. determining an optimized first matrix $W_1$ according to wideband and/or long-term channel properties, with the first matrix $W_1$ corresponding to wideband and/or long-term channel properties; b. multiplying the optimized first matrix $W_1$ with each second matrix $W_2$ in a second codebook, so as to obtain a plurality of candidate precoding matrices, with the second matrix $W_2$ corresponding to frequency-selective and/or short-term channel properties; c. selecting an optimized one from the plurality of candidate precoding matrices for precoding the data to be transmitted, according to a frequency selection and/or a short-term channel state information; characterized in that, the amount of DFT beams is increased to improve the spatial resolution; a diagonal matrix is involved in said first matrix $W_1$; and co-phasing adjustment is involved in said second matrix $W_2$, so as to guarantee the adjusted phase is evenly distributed among the whole phase space.

According to the above aspect, a diagonal matrix is involved in said first matrix $W_1$ such that the corresponding column constitutes a complete DFT beam. Compared with the art R1-105011, the amount of DFT beams suitable for ULA is increased, while the spatial resolution is increased and therefore the performance of ULA is improved. Additionally, phase adjustment is involved in said second matrix $W_2$, such that the adjustable phase for each beam is evenly distributed among the whole phase space.

According to an preferred embodiment, the amount of DFT beams is increased to improve the spatial resolution, the first matrix $W_1$ is selected from the following first codebook $C_1$:

$$C_1 = \{W_1^{(0)}, W_1^{(1)}, \ldots, W_1^{(p-1)}\},$$

$$W_1^{(k)} = \begin{bmatrix} X^{(k)} & 0 \\ 0 & X^{(k)}\Lambda^{(k)} \end{bmatrix},$$

$$k = 0, 1, \ldots, p-1$$

Wherein, p is the amount of the first matrix in the first codebook $C_1$, and $$X^{(k)} = [\, f_{k_1} \quad f_{k_2} \quad \cdots \quad f_{k_q} \,],$$

$$\Lambda^{(k)} = \mathrm{diag}[(e^{j\theta_{k_1}\cdot(M/2)}, e^{j\theta_{k_2}\cdot(M/2)}, \ldots e^{j\theta_{k_q}\cdot(M/2)})],$$

Wherein, q is the amount of each group of beam, $$f_{k_n} = [\, 1 \quad e^{j\theta_{k_n}\cdot 1} \quad \cdots \quad e^{j\theta_{k_n}\cdot(M/2-1)} \,]^T,$$

$\theta_{k_n}$ is the phase difference between two neighboring element in the DFT vector with a value range of $[0,2\pi)$;

and when the amount of data flows is 1, said second codebook comprises second matrices $W_2$ as follows:

$$C_2 = \{W_2^{(0)}, W_2^{(1)}, \ldots, W_2^{(q-1)}\},$$

$$W_2^{(k)} = \frac{1}{\sqrt{2}}\begin{bmatrix} e_k \\ ae_k \end{bmatrix},$$

$$k = 0, 1, \ldots, q-1$$

and when the amount of data flows is 2, said second codebook comprises second matrices $W_2$ as follows:

$$C_2 = \{W_2^{(0)}, W_2^{(1)}, \ldots, W_2^{(q-1)}\},$$

$$W_2^{(k)} = \frac{1}{\sqrt{2}}\begin{bmatrix} e_k & e_k \\ ae_k & -ae_k \end{bmatrix},$$

$$k = 0, 1, \ldots, q-1$$

Wherein, $e_k$ is an elementary vector with the (k+1)th element being 1 and other elements being zero, and a is a parameter related with the polarization manner of the antennas.

According a second aspect of the invention, it is proposed a method, in the user equipments, for feeding precoding matrix for sub-band precoding back to an eNodeB, comprising the steps of: determining the optimized first matrix $W_1$ and the precoding matrix, by using a method according to the first aspect of the invention; determining an optimized second matrix $W_2$ corresponding to said optimized precoding matrix; providing, for the eNodeB, identifications of said optimized first matrix $W_1$ and said second matrix $W_2$.

According to a third aspect of the invention, it is proposed a method, in eNodeBs, for precoding data, comprising: receiving identifications of an optimized first matrix $W_1$ and an optimized second matrix $W_2$, fed back by user equipments; determining, from the first codebook and the second code book in a method according to any one of claims 1 to 5, the optimized first matrix $W_1$ and the optimized second matrix $W_2$, according to the identifications; multiplying the optimized first matrix $W_1$ and the optimized second matrix $W_2$, and obtaining an optimized precoding matrix; precoding the data to be transmitted, by using the optimized precoding matrix, so as to transmit the data to the user equipment.

According to the fourth aspect of the invention, it is provided a device, in user equipments, for feeding precoding matrix for sub-band precoding back to an eNodeB, comprising: a determining means, for determining the optimized first matrix $W_1$ and the precoding matrix, by using a method according to the first aspect of the invention, and for determining an optimized second matrix $W_2$ corresponding to said optimized precoding matrix; a sender, for providing, for the eNodeB, identifications of said optimized first matrix $W_1$ and said second matrix $W_2$.

According to a fifth aspect of the invention, it is provided a device, in eNodeBs, for precoding data, comprising: a receiver, for receiving identifications of an optimized first matrix $W_1$ and an optimized second matrix $W_2$, fed back by user equipments; an inquiring means, for determining, from the first codebook and the second code book in a method according to the first aspect of the invention, the optimized first matrix $W_1$ and the optimized second matrix $W_2$, from the identifications; a calculating means, for multiplying the optimized first matrix $W_1$ and the optimized second matrix $W_2$, and obtaining an optimized precoding matrix for the sub-band precoding; a precoder, for precoding the data to be transmitted, by using the optimized precoding matrix.

The above and other features of the invention will be elucidated in the detailed embodiments below.

DETAILED EMBODIMENTS

Firstly, the design of the codebook according to the invention will be elucidated as following.

At first, multiple-input multiple-output with M transmitting antennas of uniform linear array (ULA) is taken as example. It is supposed that codeword $W_1 \in C_1$ targets wide-band/long-term channel properties, and $W_2 \in C_2$ targets frequency-selective/short-term channel properties. The amount of $W_1$, namely the size of the codebook $C_1$ is denoted by p, and the amount of $W_2$, namely the size of the codebook $C_2$ is denoted by q respectively. The precoding matrix for a sub-band has the form of $W = W_1 W_2$. For closely-spaced ULA (for example, the mode of the co-relation factor of the antennas is greater than a predetermined threshold, or the distance between the antennas is smaller than or equals to half of the signal wavelength), the dominated eigen-vector of the channel matrix can be approximated by a DFT vector. Hence, the invention proposes the codewords for $W_1$ and $W_2$ to satisfy that W is a M×1 DFT vector. And the specific $W_1$ and $W_2$ are proposed as follows.

(1) $W_1$ Codebook Design

Define (M/2)×1 DFT vector $$f_{k_n} = [1 \quad e^{j\theta_{k_n} \cdot 1} \quad \ldots \quad e^{j\theta_{k_n} \cdot (M/2-1)}]^T$$

Wherein, $\theta_{k_n}$ is the phase difference between two neighboring elements in the DFT vector, the value range of which is $[0, 2\pi)$;

Define p DFT sets with a dimension of (M/2)×q $$X^{(k)} = [f_{k_1} f_{k_2} \ldots f_{k_q}], k=0,1,\ldots,p-1.$$

And define p diagonal matrices $$\Lambda^{(k)} = \text{diag}\left[\left(e^{j\theta_{k_1} \cdot (M/2)}, e^{j\theta_{k_2} \cdot (M/2)}, \ldots e^{j\theta_{k_q} \cdot (M/2)}\right)\right],$$
$$k = 0, 1, \ldots, p-1.$$

Then $W_1$ is designed as $$W_1^{(k)} = \begin{bmatrix} X^{(k)} & 0 \\ 0 & X^{(k)} \Lambda^{(k)} \end{bmatrix},$$
$$k = 0, 1, \ldots, p-1$$

That is to say the codebook $C_1$ is $$C_1 = \{W_1^{(0)}, W_1^{(1)}, \ldots, W_1^{(p-1)}\}$$

(2) $W_2$ Codebook Design

Define $e_k$ as the elementary vector, i.e. the (k+1) th column of identity matrix.

For one data flow, namely rank 1, $W_2$ is $$W_2^{(k)} = \frac{1}{\sqrt{2}} \begin{bmatrix} e_k \\ e_k \end{bmatrix},$$
$$k = 0, 1, \ldots, q-1$$

For two data flows, namely rank 2, $W_2$ is $$W_2^{(k)} = \frac{1}{\sqrt{2}} \begin{bmatrix} e_k & e_k \\ e_k & -e_k \end{bmatrix},$$
$$k = 0, 1, \ldots, q-1$$

The codebook $C_2$ is $$C_2 = \{W_2^{(0)}, W_2^{(1)}, \ldots, W_2^{(q-1)}\}$$

Based on the $W_1$ and $W_2$ designed above, the corresponding precoding matrix $W = W_1 W_2$ has the form of DFT vector, which matches channel characteristics well for closely-spaced co-polarized antennas. It should be noted that although the precoding matrix is written as the multiplication of $W_1$ and $W_2$, in practice W can be easily obtained without doing matrix multiplication by selecting corresponding elements in $W_1$ based on the positions of 1 in $W_2$. Thus, even if the dimension of $W_1$ is large, the practical computational complexity is low.

For cross-polarized linear array (CLA) antennas, the codebook $C_1$ and codeword $W_1$ stay as they are, and codeword $W_2$ is adjusted by a co-phasing factor a.

Specifically, for one data flow, namely rank 1, $W_2$ is $$W_2^{(k)} = \frac{1}{\sqrt{2}} \begin{bmatrix} e_k \\ ae_k \end{bmatrix},$$
$$k = 0, 1, \ldots, q-1$$

For two data flows, namely rank 2, $W_2$ is $$W_2^{(k)} = \frac{1}{\sqrt{2}}\begin{bmatrix} e_k & e_k \\ ae_k & -ae_k \end{bmatrix},$$

$$k = 0, 1, \ldots, q-1$$

Codebook $C_2$ is $$C_2 = \{W_2^{(0)}, W_2^{(1)}, \ldots, W_2^{(q-1)}\}$$

When it is used for ULA antennas, a=1. When it is used for CLA or when the same codebook is used for various polarization manner of the antennas, the value of a is selected from a set $\{e^{j\beta_1}, e^{j\beta_2}, \ldots, e^{j\beta_m}\}$, wherein, m is the amount of values of a, the values of $\beta_1, \beta_2, \ldots, \beta_m$ are selected in a range of $[0, 2\pi)$, generally selected as evenly distributed among $[0, 2\pi)$ namely $$\beta_k = \frac{2\pi(k-1)}{m},$$

$$k = 1, 2, \ldots, m.$$

The following part describes the design of the above codewords $W_1$ and $W_2$. In this embodiment, eNB has 8 antenna elements.

(1) Codebook $C_1$ $$B = [b_0 \ b_1 \ \ldots \ b_{31}],$$

$$[B]_{1+m,1+n} = e^{j\frac{2\pi mn}{32}},$$

$$m = 0, 1, 2, 3, n = 0, 1, \ldots, 31$$

$$X^{(k)} \in$$

$$\{[b_{2k\bmod 32} \ b_{(2k+1)\bmod 32} \ b_{(2k+2)\bmod 32} \ b_{(2k+3)\bmod 32}]: k = 0, 1, \ldots, 15\}$$

$$W_1^{(k)} = \begin{bmatrix} X^{(k)} & 0 \\ 0 & X^{(k)}\Lambda^{(k)} \end{bmatrix}$$

$$\Lambda^{(k)} = \mathrm{diag}\left(\left[e^{j\frac{2\pi 4}{32}(2k\bmod 32)}, \right.\right.$$

$$\left.\left. e^{j\frac{2\pi 4}{32}((2k+1)\bmod 32)}, e^{j\frac{2\pi 4}{32}((2k+2)\bmod 32)}, e^{j\frac{2\pi 4}{32}((2k+3)\bmod 32)}\right]\right)$$

$$C_1 = \{W_1^{(0)}, W_1^{(1)}, W_1^{(2)}, \ldots, W_1^{(15)}\}$$

(2) Codebook $C_2$

For one data flow, namely rank 1, $$W_2 \in C_2 = \left\{\frac{1}{\sqrt{2}}\begin{bmatrix} Y \\ aY \end{bmatrix}\right\}$$

$$Y \in \{e_0, e_1, e_2, e_3\},$$

$$a = \begin{cases} 1 & ULA \\ \{l, -l, j, -j\} & ULA \text{ and } CLA \end{cases}$$

Wherein, $e_k$ is the elementary vector with all zeros except for the (k+1)th element with value 1.

For two data flows, namely rank 2, $$W_2 \in C_2 = \left\{\frac{1}{\sqrt{2}}\begin{bmatrix} Y_1 & Y_2 \\ aY_1 & -aY_2 \end{bmatrix}\right\}$$

$$(Y_1, Y_2) \in \{(e_0, e_0), (e_1, e_1), (e_2, e_2), (e_3, e_3)\}$$

$$a = \begin{cases} 1 & ULA \\ \{l, -l, j, -j\} & ULA \text{ and } CLA \end{cases}$$

When the codebook $C_2$ is used for ULA, $C_2$ comprises four second matrices $W_2$, and when the codebook $C_2$ is used for both ULA and CLA simultaneously, $C_2$ comprises sixteen second matrices $W_2$.

It should be noted that in the art R1-105011, since there are only 4 choices for co-phasing factor, the number of the DFT beams of the 8 antennas is only 16 and could not be increased to 32. The above example proposed by the invention increases the number of the DFT beams of the 8 antennas from 16 to 32, so as to increase the spatial resolution.

The codewords determined according to the invention are described in the above example. It should be noted that the invention is not limited by the above codeword design. In case that the number of at least one of antenna elements, codeword $W_1$, codeword $W_2$, phase $\theta_{k_n}$ and co-phasing factor a changes, the codewords can be adjusted accordingly.

The above part discusses the codewords proposed by the invention. The following part will describe the embodiment of carrying out precoding communication based on the codewords determined by the invention.

Firstly, the determining means in the user equipment (UE) measures wideband and/or long-term channel related information, and selects, from the first codebook $C_1$ an first matrix, namely the codeword $W_1$, according to the channel related information. The UE can determine the optimized codeword corresponding to the wideband and/or long-term channel related information, according to the criteria of maximum capacity or minimum distance with the eigen-vector of the channel correlation matrix.

After that, the determining means multiplies the first matrix $W_1$ with each second matrix $W_2$ in the second codebook $C_2$, so as to obtain a plurality of candidate precoding matrices.

Then, the determining means selects an optimized precoding matrix from the plurality of candidate precoding matrices based on the predefined rules, according to the measured frequency selection and/or short-term channel state information. The predefined rules are for example rules that can select a candidate precoding matrix enabling a maximum channel capacity, or select a candidate precoding matrix with a minimum distance with the eigen-vector of the channel correlation matrix. It should be noted that other rules are also applicable, and the description will not give unnecessary details.

Then, the determining means can determine an optimized second matrix $W_2$ corresponding to the optimized precoding matrix.

At last, the sender of the UE provides, for the eNodeB, identifications, such as the serial numbers of the matrix in the codebook, of the optimized first matrix $W_1$ and the optimized second matrix $W_2$.

At the eNodeB, the receiver of the eNodeB receives identifications of the optimized first matrix $W_1$ and the optimized second matrix $W_2$, fed back by user equipments.

Then, the inquiring means of the eNodeB determines, from the first codebook $C_1$ and the second code book $C_2$, the optimized first matrix $W_1$ and the optimized second matrix $W_2$, according to the identifications.

After that, the calculator of the eNodeB obtains an optimized precoding matrix for sub-band precoding in the manner illustrated above, according to the first matrix $W_1$ and the second matrix $W_2$.

At last, the precoder of the eNodeB precodes the data to be transmitted, by using the optimized precoding matrix, so as to transmit the precoded data to the user equipment.

The inventor simulates the performance of the codebook proposed by the invention, and compares it with the simulation results of R1-105011 in the art. The simulation uses 19 cells/57 pentagon sectors. The following table 1 shows the assumed wireless network environment, based on which the simulation is carried out.

TABLE 1

| Parameter | Assumptions used for evaluation |
|---|---|
| Deployment scenario | 3GPP case 1 3D, SCM-UMa with low angle spread (8 deg) |
| Cell number | 19 cells with 3 sectors per cell |
| Wrap-around model | Yes |
| Duplex method and bandwidths | FDD: 10 MHz for downlink |
| Network synchronization | Synchronized |
| Traffic model | Full-buffer |
| UE number per sector | 10 |
| Maximal number of co-scheduled UE | 4 |
| Handover margin | 1.0 dB |
| eNB Antenna assumptions | 8Tx: Co-polarized antennas with 0.5-lambda spacing: Vertically polarized |
| UE antenna assumptions | 2Rx: A single co-polarized ULA with 0.5-lambda spacing with vertical polarization |
| UE antenna orientation | Random distribution within range [−90, 90] degrees |
| Calibrated antenna array | Ideal |

| Downlink transmission scheme | Approach | Max rank per UE | Dynamic SU/MU-MIMO switching |
|---|---|---|---|
| | Proposed approach | SU: 2 MU: 1 | Yes |
| | Approach in R1-105011 | SU: 2 MU: 1 | Yes |

| | |
|---|---|
| | Note: All MU-MIMO schemes are based on low-bound MU CQI, DMRS, ZF precoding, w/SU and MU MIMO switching |
| Downlink scheduler | Proportional fair, frequency selective |
| Feedback assumptions (feedback periodicity in time domain, feedback granularity in frequency domain) | long-term/wideband W1 and short-term/sub-band W2, and sub-band CQI Sub-band CQI report: 5 ms periodicity, 6 ms delay, with measurement error: N(0.1 dB) per PRB W1 and W2 report: 5 ms periodicity for both W1 and W2, and 6 ms feedback delay |
| CQI | SU-CQI for SU-MIMO and low-bound MU-CQI for MU-MIMO |
| Downlink HARQ scheme | Synchronous HARQ, Chase combining |
| Downlink receiver type | MMSE |
| CSI-RS based CSI estimation error | Real |
| DM-RS channel estimation | Real |
| Feedback error | Yes, 1% codeword error rate |
| HARQ | Chase combing with max 4 retransmissions |
| Control channel and reference signal overhead | Fixed 0.3063 (As agreed in ITU evaluation) |
| test configuration | 800 subframes |

The simulation results are listed in the following table 2:

TABLE 2

| Codebook type | average cell spectral efficiency (bits/s/Hz/cell) | 5% Cell edge spectral efficiency (bits/s/Hz/user) |
|---|---|---|
| Proposed codebooks | 4.4563 (100%) | 0.1433 (100%) |
| Codebooks in R1-105011 | 5.0596 (113.54%) | 0.1506 (105.09%) |

It can be seen that the invention achieves better performance than the art.

Those ordinary skilled in the art could understand and realize modifications to the disclosed embodiments, through studying the description, drawings and appended claims. The word "comprising" does not exclude the presence of elements or steps not listed in a claim or in the description. The word "a" or "an" preceding an element does not exclude the presence of a plurality of such elements. In the practice of present invention, several technical features in the claim can be embodied by one component.

What is claimed is:

1. A method for determining precoding matrix for the sub-band precoding in a transmitter, wherein the transmitter has M transmitting antennas, and the method comprises:

determining an optimized first matrix $W_1$ according to wideband and/or long-term channel properties, with the first matrix $W_1$ corresponding to wideband and/or long-term channel properties;

multiplying the optimized first matrix $W_1$ with a second matrix $W_2$ in a second codebook, so as to obtain a plurality of candidate precoding matrices, with the second matrix $W_2$ corresponding to frequency-selective and/or short-term channel properties;

selecting an optimized one from the plurality of candidate precoding matrices for precoding the data to be transmitted, according to a frequency selection and/or a short-term channel state information;

wherein, the amount of discrete Fourier transform (DFT) beams is increased to improve the spatial resolution; a diagonal matrix is involved in said first matrix $W_1$; and phase adjustment is involved in said second matrix $W_2$, so as to guarantee the adjusted phase is evenly distributed among the whole phase space.

2. A method as claimed in claim 1, wherein the amount of DFT beams is increased to improve the spatial resolution, the first matrix $W_1$ is selected from the following first codebook $C_1$:

$$C_1 = \{W_1^{(0)}, W_1^{(1)}, \ldots, W_1^{(p-1)}\},$$

$$W_1^{(k)} = \begin{bmatrix} X^{(k)} & 0 \\ 0 & X^{(k)}\Lambda^{(k)} \end{bmatrix},$$

$$k = 0, 1, \ldots, p-1$$

wherein, p is the amount of the first matrix in the first codebook $C_1$, and $$X^{(k)} = [f_{k_1} \ f_{k_2} \ \cdots \ f_{k_q}],$$

$$\Lambda^{(k)} = \mathrm{diag}[(e^{j\theta_{k_1} \cdot (M/2)}, e^{j\theta_{k_2} \cdot (M/2)}, \ldots e^{j\theta_{k_q} \cdot (M/2)}]),$$

Wherein, q is the amount of each group of beam, $$f_{k_n} = [1 \ e^{j\theta_{k_n} \cdot 1} \ \ldots \ e^{j\theta_{k_n} \cdot (M/2-1)}]^T,$$

$\theta_{k_n}$ is the phase difference between two neighboring element in the DFT vector with a value range of $[0, 2\pi)$;

and when the amount of data flows is 1, said second codebook comprises second matrices $W_2$ as follows:

$$C_2 = \{W_2^{(0)}, W_2^{(1)}, \ldots, W_2^{(q-1)}\},$$

$$W_2^{(k)} = \frac{1}{\sqrt{2}} \begin{bmatrix} e_k \\ ae_k \end{bmatrix},$$

$$k = 0, 1, \ldots, q-1$$

and when the amount of data flows is 2, said second codebook comprises second matrices $W_2$ as follows:

$$C_2 = \{W_2^{(0)}, W_2^{(1)}, \ldots, W_2^{(q-1)}\},$$

$$W_2^{(k)} = \frac{1}{\sqrt{2}} \begin{bmatrix} e_k & e_k \\ ae_k & -ae_k \end{bmatrix},$$

$$k = 0, 1, \ldots, q-1$$

Wherein, $e_k$ is an elementary vector with the (k+1)th element being 1 and other elements being zero, and a is a parameter related with the polarization manner of the antennas.

3. A method, in the user equipments, for feeding precoding matrix for sub-band precoding back to an eNodeB, comprising :

determining the optimized first matrix $W_1$ and the precoding matrix, by using a method as claimed in claim 1;
determining an optimized second matrix $W_2$ corresponding to said optimized precoding matrix;
providing, for the eNodeB, identifications of said optimized first matrix $W_1$ and said second matrix $W_2$.

4. A method, in eNodeBs, for precoding data, comprising:
receiving identifications of an optimized first matrix $W_1$ and an optimized second matrix $W_2$, fed back by user equipments;
determining, from the first codebook and the second code book in a method according to claim 1, the optimized first matrix $W_1$ and the optimized second matrix $W_2$, according to the identifications;
multiplying the optimized first matrix $W_1$ and the optimized second matrix $W_2$, and obtaining an optimized precoding matrix;
precoding the data to be transmitted, by using the optimized precoding matrix.

5. A device, in user equipments, for feeding precoding matrix for sub-band precoding back to an eNodeB, comprising:
a processor that determines the optimized first matrix $W_1$ and the precoding matrix, by using a method as claimed in claim 1, and an optimized second matrix $W_2$ corresponding to said optimized precoding matrix;
a transmitter that provides to the eNodeB identifications of said optimized first matrix $W_1$ and said second matrix $W_2$.

6. A device, in eNodeBs, for precoding data, comprising:
a receiver that receives identifications of an optimized first matrix $W_1$ and an optimized second matrix $W_2$, fed back by user equipments;
a processor that determines from the first codebook and the second code book in a method according to claim 1, the optimized first matrix $W_1$ and the optimized second matrix $W_2$, from the identifications;
a calculator that multiplies the optimized first matrix $W_1$ and the optimized second matrix $W_2$, and obtaining an optimized precoding matrix for the sub-band precoding;
a precoder that precodes the data to be transmitted, by using the optimized precoding matrix.

7. A method as claimed in claim 2, wherein the value of a is 1 when the polarization manner of the antennas is uniform linear array.

8. A method as claimed in claim 2, wherein when the polarization manner of the antennas is cross polarized linear array or when the same codebook is used for various polarization manner of the antennas, a is selected from a set $\{e^{j\beta_1}, e^{j\beta_2}, \ldots e^{j\beta_m}\}$, wherein m is the amount of values of a, the values of $\beta_1, \beta_2, \ldots, \beta_m$ are selected in a range of $[0, 2\pi)$, generally selected as evenly distributed among $[0, 2\pi)$ namely $$\beta_k = \frac{2\pi(k-1)}{m},$$

$$k = 1, 2, \ldots, m.$$

9. A method as claimed in claim 2, wherein, when the transmitter has 8 antenna elements, for codebook $C_1$, $$B = [b_0 \ b_1 \ \ldots \ b_{31}],$$

$$[B]_{1+m, 1+n} = e^{j\frac{2\pi mn}{32}},$$

$$m = 0, 1, 2, 3, n = 0, 1, \ldots, 31$$

$$X^{(k)} \in$$

$$\{[b_{2k \bmod 32} \; b_{(2k+1) \bmod 32} \; b_{(2k+2) \bmod 32} \; b_{(2k+3) \bmod 32}]: k = 0, 1, \ldots, 15\}$$

$$W_1^{(k)} = \begin{bmatrix} X^{(k)} & 0 \\ 0 & X^{(k)}\Lambda^{(k)} \end{bmatrix}$$

$$\Lambda^{(k)} = \mathrm{diag}\Big(\Big[e^{j\frac{2\pi 4}{32}(2k \bmod 32)},$$

$$e^{j\frac{2\pi 4}{32}((2k+1) \bmod 32)}, e^{j\frac{2\pi 4}{32}((2k+2) \bmod 32)}, e^{j\frac{2\pi 4}{32}((2k+3) \bmod 32)}\Big]\Big)$$

$$C_1 = \{W_1^{(0)}, W_1^{(1)}, W_1^{(2)}, \ldots, W_1^{(15)}\},$$

for codebook $C_2$,
when the amount of data flows is 1, $$W_2 \in C_2 = \left\{ \frac{1}{\sqrt{2}} \begin{bmatrix} Y \\ aY \end{bmatrix} \right\}$$

$$Y \in \{e_0, e_1, e_2, e_3\},$$

$$a = \begin{cases} 1 & ULA \\ \{l, -l, j, -j\} & ULA \text{ and } CLA \end{cases}$$

wherein $e_k$ is an elementary vector with the (k+1)th element being 1 and other elements being zero,
when the amount of data flows is 2, namely rank 2, $$W_2 \in C_2 = \left\{ \frac{1}{\sqrt{2}} \begin{bmatrix} Y_1 & Y_2 \\ aY_1 & -aY_2 \end{bmatrix} \right\}$$

$$(Y_1, Y_2) \in \{(e_0, e_0), (e_1, e_1), (e_2, e_2), (e_3, e_3)\}$$

$$a = \begin{cases} 1 & ULA \\ \{l, -l, j, -j\} & ULA \text{ and } CLA, \end{cases}$$

when the codebook $C_2$ is used for ULA, $C_2$ comprises four second matrices $W_2$, and when the codebook $C_2$ is used for both ULA and CLA simultaneously, $C_2$ comprises sixteen second matrices $W_2$.

\* \* \* \* \*